United States Patent
Kobayashi et al.

(10) Patent No.: US 8,229,637 B2
(45) Date of Patent: Jul. 24, 2012

(54) SHIFT CONTROLLER

(75) Inventors: Masaki Kobayashi, Saitama (JP); Kenichi Machida, Saitama (JP); Eiji Kittaka, Saitama (JP); Seiji Hamaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 381 days.

(21) Appl. No.: 12/543,020

(22) Filed: Aug. 18, 2009

(65) Prior Publication Data
US 2010/0082210 A1 Apr. 1, 2010

(30) Foreign Application Priority Data
Sep. 29, 2008 (JP) ................................. 2008-250346

(51) Int. Cl.
*G06F 19/00* (2011.01)
(52) U.S. Cl. .......................................... 701/66; 701/51
(58) Field of Classification Search .................... 701/51, 701/66, 67, 52, 55, 56; 74/330, 331, 335, 74/473.1, 473.12, 473.21; 477/156, 70, 5, 477/115, 161
See application file for complete search history.

(56) References Cited

U.S. PATENT DOCUMENTS

| | | | | |
|---|---|---|---|---|
| 5,590,563 A * | 1/1997 | Kuwahata et al. | ........... | 74/337.5 |
| 6,484,597 B2 * | 11/2002 | Ota et al. | ......................... | 74/335 |
| 7,631,570 B2 * | 12/2009 | Mizuno et al. | .................. | 74/331 |
| 2009/0078069 A1 * | 3/2009 | Nedachi et al. | ................. | 74/330 |

FOREIGN PATENT DOCUMENTS

JP 2903932 3/1999

\* cited by examiner

*Primary Examiner* — Thomas G. Black
*Assistant Examiner* — Marthe Marc-Coleman
(74) *Attorney, Agent, or Firm* — Squire Sanders (US) LLP

(57) ABSTRACT

A shift controller for a motor vehicle includes an electric motor configured to rotate a shift drum associated with a transmission. An oil temperature sensor is configured to detect temperature of lubricating oil for the transmission. A controller is configured to control the electric motor. The controller controls the electric motor to operate in a preset first motor duty until a first predetermined time elapses after operation of the electric motor is started when the shift drum is turned from a first predetermined position to a second predetermined position. The controller is also configured to operate the electric motor in a second motor duty calculated based upon oil temperature after the first predetermined time elapses.

16 Claims, 7 Drawing Sheets

<OIL TEMPERATURE-MOTOR DUTY TABLE>

SHIFT CONTROLLER

BACKGROUND

1. Field

The present invention relates to a shift controller, particularly relates to a shift controller of a sequential type transmission that turns a shift drum with an electric motor.

2. Description of the Related Art

A sequential type multispeed transmission which is based upon a multispeed transmission provided with plural transmission gear pairs, which drives a predetermined transmission gear and a predetermined sleeve by a shift fork fitted to a shift drum. The shift fork switches the engagement of a dog clutch provided between transmission gears and executes a shift. In addition, a configuration that enables an automatic shift or a semi automatic shift by driving the shift drum and a clutch of such a multispeed transmission with an electric motor is known.

The shift drum and the transmission gear are ordinarily lubricated by lubricating oil. The temperature of the lubricating oil varies depending upon outside air temperature, the heat of an engine, and other factors. When the viscosity of the lubricating oil varies according to the variation of the temperature, the revolution speed of the shift drum may vary even if the same driving signal is applied to the electric motor for the shift drum. A change of the revolution speed of the shift drum may have an effect on noise and shift effect when the dog clutch is engaged.

JP Patent No. 2903932 (JP '932) discloses a shift controller that drives a step motor for changing the transmission gear ratio of a friction roller type continuously variable transmission at normal speed when the temperature of lubricating oil is equal to or below a predetermined value, and drives the step motor at lower speed than the normal speed when the temperature of the lubricating oil exceeds the predetermined value.

However, when technique disclosed in JP '932 is applied to the above-mentioned sequential type multispeed transmission, the technique has a problem that time from the start of a shift till the completion of the shift varies according to the variation of the temperature of lubricating oil. Therefore, for example, when the temperature of lubricating oil is high, it takes much time to shift in response to an instruction of a shift and a response may be deteriorated. Further, in a transmission that switches the engagement of a dog clutch configured by a dog tooth and a dog slit and shifts speed, as the engagement of the dog clutch that establishes the current speed is required to be released at an initial stage of a shift, it may be difficult to release the engagement of the dog clutch when the revolution speed of a shift drum is reduced in the whole section from the start of a shift till the completion thereof.

SUMMARY

In one embodiment, a shift controller for a motor vehicle includes an electric motor configured to rotate a shift drum associated with a transmission. An oil temperature sensor is configured to detect temperature of lubricating oil for the transmission. A controller is configured to control the electric motor. The controller controls the electric motor to operate in a preset first motor duty until a first predetermined time elapses after operation of the electric motor is started when the shift drum is turned from a first predetermined position to a second predetermined position. The controller is also configured to operate the electric motor in a second motor duty calculated based upon oil temperature after the first predetermined time elapses.

In another embodiment, the invention includes a method of controlling shifting in a motor vehicle. The method includes providing an electric motor, and then rotating, with the electric motor, a shift drum associated with a transmission. A temperature of lubricating oil for the transmission is detected with an oil temperature sensor. The electric motor is controlled with a controller such that the electric motor operates in a preset first motor duty until a first predetermined time elapses after the operation of the electric motor is started when the shift drum is turned from a first predetermined position to a second predetermined position. The electric motor is operated in a second motor duty calculated based upon oil temperature after the first predetermined time elapses.

In another embodiment, a shift controller for a motor vehicle includes motor means for rotating a shift drum associated with a transmission, and oil temperature sensor means for detecting temperature of lubricating oil for the transmission. Controller means are provided for controlling the motor means, such that the motor means operates in a preset first motor duty until a first_a first predetermined time elapses after operation of the motor means is started when the shift drum is turned from a first predetermined position to a second predetermined position. The controller means is also for operating the motor means in a second motor duty calculated based upon oil temperature after the first predetermined time elapses.

DETAILED DESCRIPTION

Figure 1:
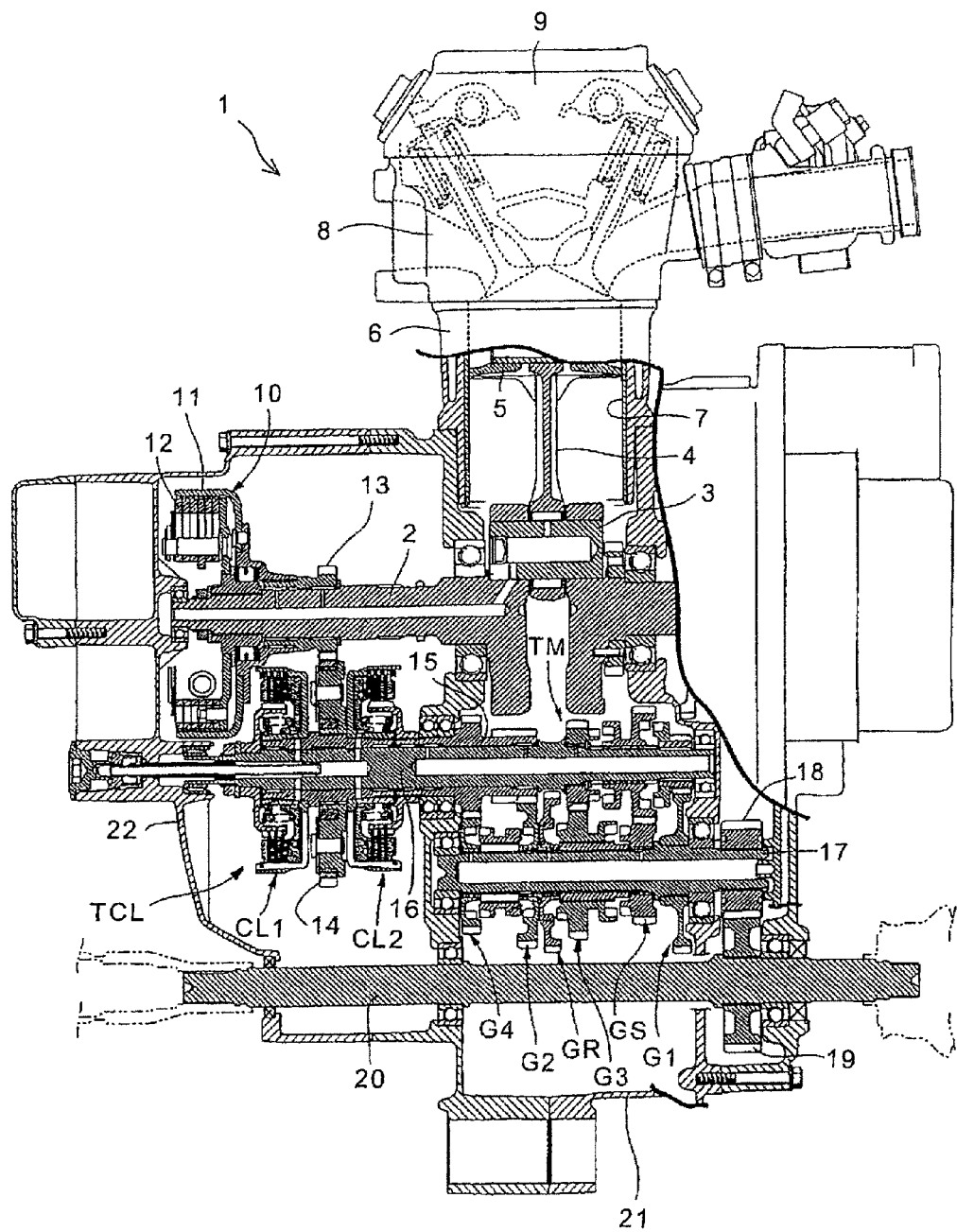
FIG. 1 is a sectional view showing an engine to which a shift controller equivalent to one embodiment of the present invention is applied.

An object of the present invention is to provide a shift controller that addresses the problem of the related art and varies the revolution speed of an electric motor for driving a shift drum according to the variation of oil temperature only for predetermined time till the completion of a shift.

Embodiments of the present invention can be based upon a shift controller of a sequential type multispeed transmission that displaces a shift fork driven in an axial direction of a shift drum according to turning of the shift drum and switches engagement of a dog clutch. Some embodiments can have a first characteristic that an electric motor that turns the shift drum, an oil temperature sensor that detects the temperature of oil for lubricating the transmission and a controller that controls the electric motor can be provided. The controller drives the electric motor in preset first motor duty until first predetermined time elapses after the drive of the electric motor is started when the shift drum is turned from a predetermined turned position to the adjacent next predetermined turned position, The controller an also drive the electric motor in motor duty calculated according to oil temperature after the first predetermined time elapses.

Embodiments of the present invention can have a second characteristic that the first predetermined time is set so that the first predetermined time includes time until the engagement of the dog clutch is released.

Embodiments of the present invention can have a third characteristic that a second predetermined time after the first predetermined time elapses is set to a period until the engagement of a dog clutch for the next speed is started. In the second predetermined time, the electric motor is driven in the motor duty calculated according to the oil temperature and a minimum value in a range in which the motor duty is set is set to a smaller value than that in the first predetermined time.

The present invention can have a fourth characteristic, in certain embodiments, that the drive of the electric motor depending upon motor duty calculated according to oil temperature is not executed in third predetermined time after the second predetermined time elapses.

Embodiments of the present invention can have a fifth characteristic that after the third predetermined time elapses, the turning of the shift drum is completed in fourth predetermined time. In the fourth predetermined time, the electric motor can be driven in motor duty calculated according to oil temperature and a minimum value in a range in which the motor duty is set in the fourth predetermined time is set to a smaller value, than the minimum value in the range in which the motor duty applied in the second predetermined time is set.

Embodiments of the present invention can have a sixth characteristic that the first to fourth predetermined times are predetermined.

Embodiments of the present invention can also have a seventh characteristic that a data table for deriving each motor duty applied in the second predetermined time and the fourth predetermined time based upon the oil temperature is provided.

The present invention, in other embodiments, can have an eighth characteristic that the transmission is a twin clutch type transmission which is provided with a body of the transmission having plural gear pairs according to speed between a main shaft and a countershaft and a twin clutch configured by a first clutch and a second clutch respectively arranged on the main shaft and in which torque of an engine is connected/disconnected between the engine and the body of the transmission by the twin clutch. The controller can execute a preparatory shift in which the shift drum is turned to a predetermined turned position according to the next speed beforehand while the torque is transmitted at predetermined speed and the control of motor duty by the controller is executed in the preparatory shift.

According to the first characteristic, as the controller drives the electric motor in the preset first motor duty until the first predetermined time elapses after the drive of the electric motor is started when the shift drum is turned from the predetermined turned position to the adjacent next predetermined turned position and further, drives the electric motor in the motor duty calculated according to the oil temperature after the first predetermined time elapses, the revolution speed of the shift drum can be varied according to the oil temperature during the shift. For example, when the temperature of lubricating oil is high and the viscosity thereof is low, that is, when the shift drum is apt to be turned quickly even if motor duty is the same, the motor duty is reduced after the first predetermined time elapses and the revolution speed of the shift drum can be inhibited or reduced. In this manner, the noise in the engagement of the dog clutch can be reduced. Even when the output of the motor is reduced according to oil temperature, a time until the termination of a shift can be reduced by setting the output of the motor in the first predetermined time to a large value, compared with a case that the output of the motor is reduced in the whole section of the shift. In this manner, a change of a shift feeling according to a change of oil temperature can be reduced.

According to the second characteristic, as the first predetermined time is set so that the time until the engagement of the dog clutch is released is included, the engagement of the dog clutch can be smoothly released at the initial stage of the shift by setting the output of the motor in the first predetermined time to a large value. As a result, shifting time can be reduced.

According to the third characteristic, as the second predetermined time after the first predetermined time elapses is set to the period immediately before the engagement of the dog clutch for the next speed is started, in the second predetermined time. The electric motor is driven in the motor duty calculated according to the oil temperature and the minimum value in the set range of the motor duty is set to the smaller value than that in the first predetermined time. The engagement of the dog clutch for the next speed can be started after the revolution speed of the shift drum is reduced in the second predetermined time. In this manner, smooth shifting can be enabled.

According to the fourth characteristic, as in the third predetermined time after the second predetermined time elapses, the electric motor is not driven depending upon the motor duty calculated according to the oil temperature. The revolution speed of the shift drum is further reduced by reducing the revolution speed of the motor in the third predetermined time and the noise in the engagement of the dog clutch and others can be reduced.

According to the fifth characteristic, as the turning of the shift drum is completed in the fourth predetermined time after the third predetermined time elapses, the electric motor is driven in the motor duty calculated according to the oil temperature in the fourth predetermined time and the minimum value in the set range of the motor duty in the fourth predetermined time is set to the smaller value than the minimum value in the set range of the motor duty applied in the second predetermined time, pressing operation for securing the engagement of the dog clutch is enabled in the fourth predetermined time close to the completion of the shift. Besides, as each motor duty in the second predetermined time and the fourth predetermined time is calculated, the precision of shift drum drive control can be enhanced.

According to the sixth characteristic, as the first to the fourth predetermined times are predetermined, a load of a processor can be reduced, compared with a method that execution time is operated during the execution of each control.

According to the seventh characteristic, as the data table for deriving each motor duty applied in the second predetermined time and the fourth predetermined time based upon the oil temperature is provided, the derivation of the motor duty is facilitated and operation can be sped up.

According to the eighth characteristic, as the transmission is the twin clutch type transmission which is provided with the body of the transmission having the plural gear pairs according to speed between the main shaft and the countershaft and the twin clutch configured by the first clutch and the second clutch respectively arranged on the main shaft and in which the torque of the engine is connected/disconnected between the engine and the body of the transmission by the twin clutch, the controller execute the preparatory shift in which the shift drum is turned to the predetermined turned position according to the next speed beforehand while the torque is transmitted at the predetermined speed and the control of the motor duty by the controller is executed in the preparatory shift, the preparatory shift in the twin clutch type transmission can be stably executed independent of the oil temperature of the lubricating oil.

Referring to the drawings, a preferred embodiment of the present invention will be described in detail below. FIG. 1 is a sectional view showing an engine 1 to which a shift controller equivalent to one embodiment of the present invention is applied. A transmission TM which has five speeds in forward travel and which has one speed in reverse travel is integrated with the engine 1 as a power source of a saddle-ride type four-wheel vehicle and others. A connecting rod 4 is turnably supported via a crankpin 3 by a crankshaft 2 rotatably journaled by a crankcase 21. A piston 5 slid inside a sleeve 7 provided inside a cylinder 6 is attached to the other end of the connecting rod 4, and a cylinder head 8 and a cylinder head cover 9 respectively housing a valve mechanism that controls the intake and the exhaust of air-fuel mixture and combustion gas are fixed on the upside of the cylinder 6.

A starting clutch 10 provided with a clutch outer 11 and a clutch shoe 12 is provided at a left end of the crankshaft 2. In the starting clutch 10, when engine speed, that is, the number of revolutions of the crankshaft 2 exceeds a predetermined value (for example, 2000 r.p.m.), frictional force is produced between the clutch outer 11 turned together with the crankshaft 2 and the clutch shoe 12, and hereby, torque is transmitted to an output gear 13 fixed to the clutch outer 11.

The torque transmitted to the output gear 13 is transmitted to an output shaft 20 via the transmission TM including a primary gear 14, a twin clutch TCL configured by a first clutch CL1 and a second clutch CL2, an inner primary shaft 16 as a main shaft, an outer primary shaft 15 turnably journaled to the inner primary shaft and gear pairs G1 to G5, GR provided between the primary shafts 15, 16 and a countershaft 17, an output gear on the driving side 18 and an output gear on the driven side 19. As for the twin clutch TCL, the first clutch CL1 and the second clutch CL2 are arranged back to back with the primary gear 14 between the first and second clutches and a hydraulic path for driving the twin clutch is provided in an axial position of the main shaft inside a left case 22 of the crankcase 21.

Figure 2:
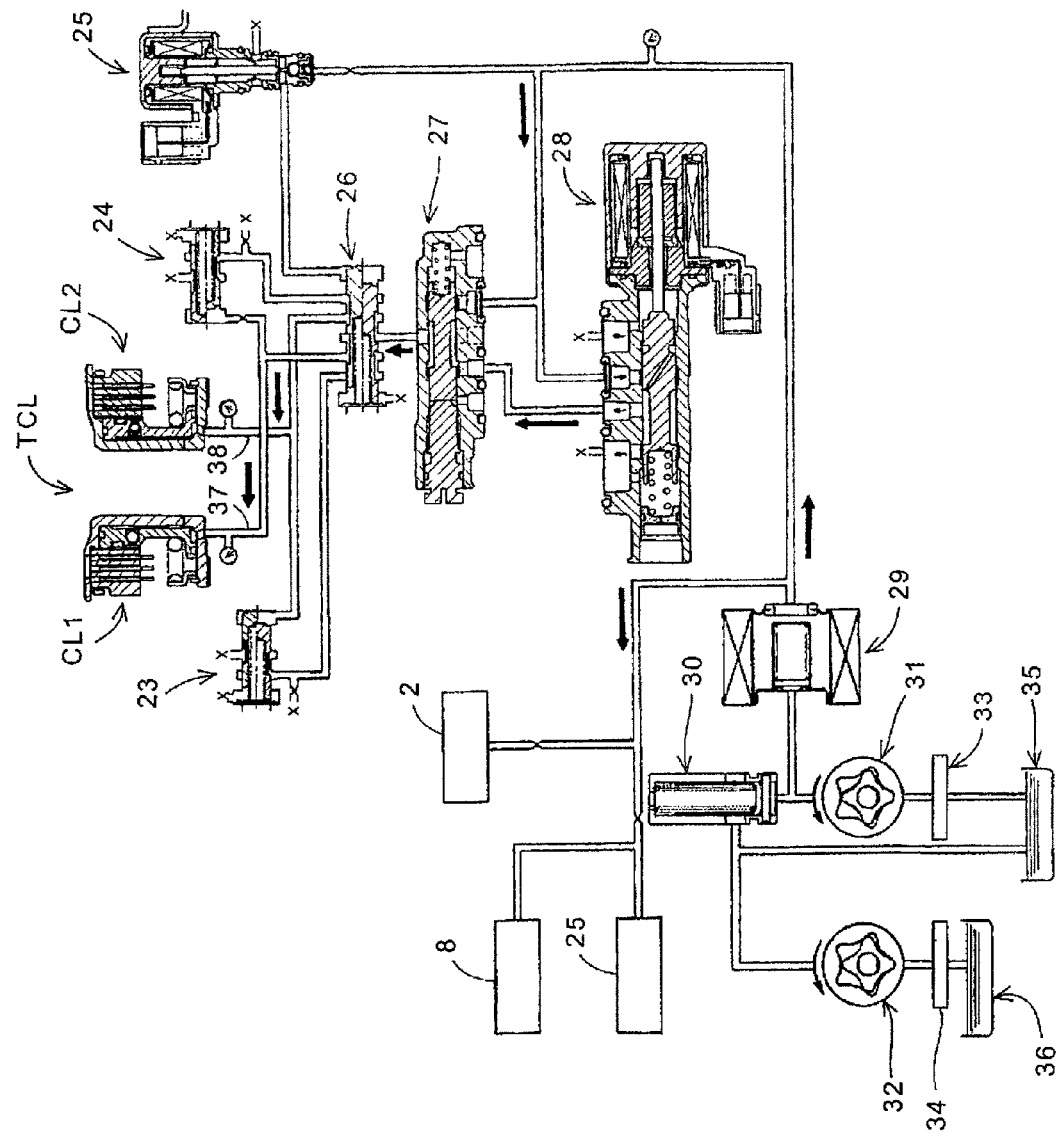
FIG. 2 is a block diagram showing oil path structure for driving a twin clutch.

FIG. 2 is a block diagram showing oil path structure for driving the hydraulic twin clutch TCL. The same reference numeral as the above-mentioned one denotes the same or the similar part. Oil pressure for driving the first clutch CL1 and the second clutch CL2 is generated by a trochoid feed pump 31 rotated according to the rotation of the crankshaft 2. Oil pumped up from an oil tank 35 via an oil strainer 33 by the feed pump 31 is supplied to the crankshaft 2, the cylinder head 8 and each lubricating path of the transmission TM via a relief valve 30 that holds the oil pressure at a predetermined value and an oil filter 29. In this embodiment, a second pump 32 that pumps up oil from an oil pan 36 via an oil strainer 34 can also be provided.

A part of the oil pressure generated by the feed pump 31 is supplied to a hydraulic circuit for driving the clutch including a linear solenoid valve 28, an emergency shut-off valve 27, a shift solenoid 25, a shift valve 26, orifice control valves 23, 24, the first clutch CL1 and the second clutch CL2. That is, in this hydraulic mechanism, a system sharing engine lubricating oil and clutch driving oil can be adopted.

In this hydraulic mechanism, the connection to the first clutch CL1 and to the second clutch CL2 is alternately switched by turning on/off electricity to the shift solenoid 25. The linear solenoid valve 28 can control oil pressure generated by the feed pump 31 and can optionally vary oil pressure supplied to both clutches. In other words, oil pressure supplying means is configured by the feed pump 31 and the single linear solenoid valve 28.

Oil pressure supplied from the linear solenoid valve 28 is introduced to the shift valve 26 via the emergency shut-off valve 27. The emergency shut-off valve 27 can directly supply oil to the shift valve 26 without passing the linear solenoid valve 28 by manually switching an oil passage and opening a bypass circuit when oil pressure cannot be supplied because of a problem of the linear solenoid valve 28 and others.

The shift solenoid 25 is opened when it is energized and when the shift solenoid is opened, working fluid for switching the oil passage is supplied to the shift valve 26. Hereby, the shift valve 26 switches a destination to which the oil pressure from the linear solenoid valve 28 is supplied to the first clutch CL1 so as to connect to the first clutch CL1. In other words, oil pressure supply destination switching means is configured by the shift solenoid 25 and the shift valve 26.

In the meantime, the shift solenoid 25 is closed when electricity is turned off. Hereby, the shift valve 26 switches the destination of the supply of the oil pressure to the second clutch CL2 so as to make the second clutch CL2 connected. The orifice control valves 23, 24 are provided with a function of reducing shift shock by relieving surplus oil pressure after each clutch is connected.

Figure 3:
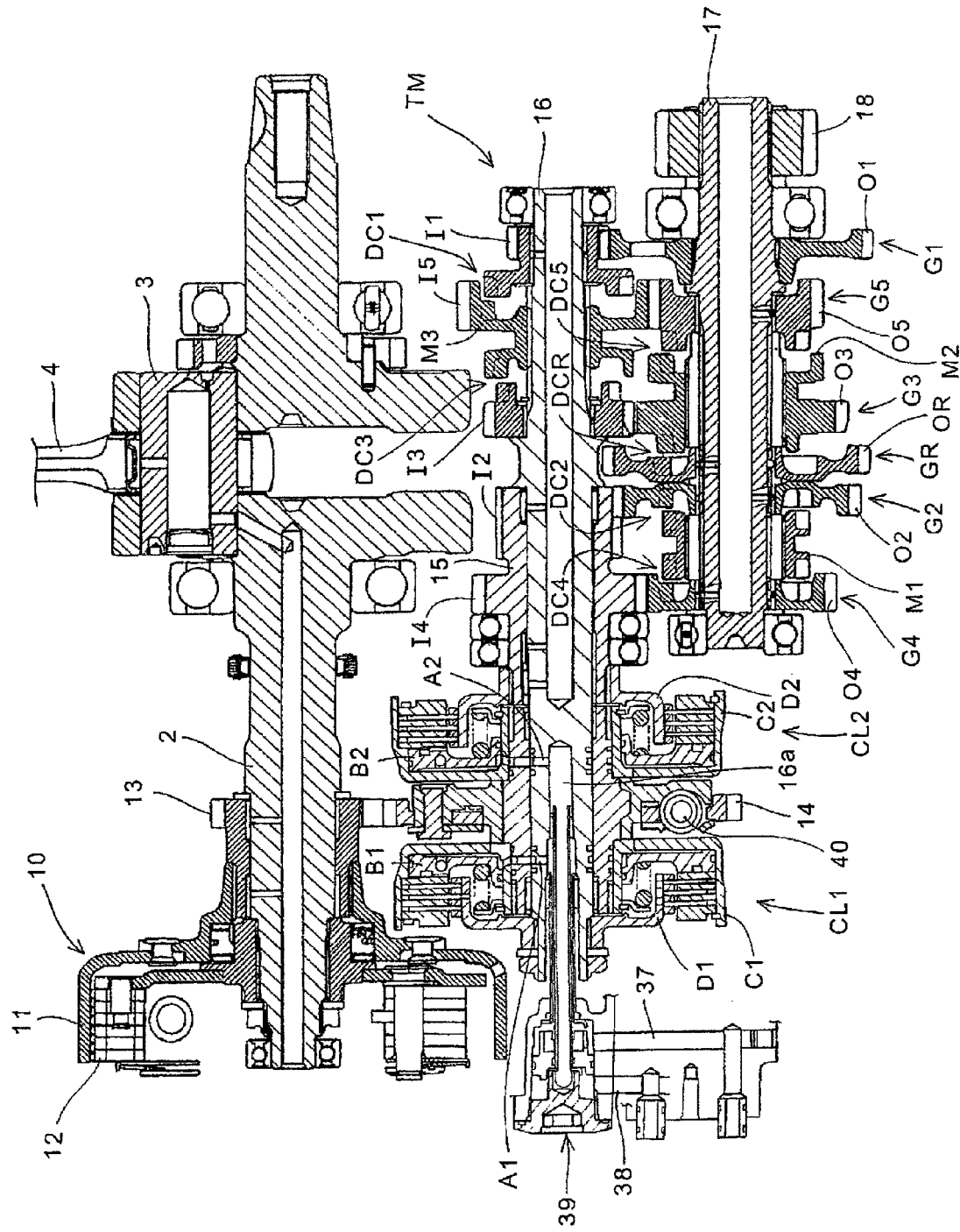
FIG. 3 is a sectional view in which a part of FIG. 1 is enlarged.

FIG. 3 is a sectional view enlarging a part of FIG. 1. The same reference numeral as the above-mentioned one denotes the same or the similar part. The transmission TM is a sequential type multispeed transmission having five speeds in forward travel and having one speed in reverse travel and a shift between each speed is executed by the combination of turning on/off the oil pressure applied to the twin clutch TCL and the sliding in an axial direction of a first sleeve M1, a second sleeve M2 and a third sleeve M3 as a shift mechanism.

In the primary gear 14 turnably connected to the outer primary shaft 15 and the inner primary shaft 16, a shock absorption mechanism by a spring 40 is incorporated into absorb a shock when driving force is transmitted. In this embodiment, the first clutch CL1 and the second clutch CL2 have the same configuration by the combination of the same parts. The configuration of the first clutch CL1 as a representative will be described below and the corresponding part of the second clutch CL2 will be shown in parentheses.

A piston B1 (B2) inserted in an airtight condition via an oil seal is provided to the first clutch CL1 (the second clutch CL2) at the bottom of a clutch case C1 (C2) fixed to the primary gear 14. The piston B1 (B2) is pushed out leftward in drawing (rightward) when working oil is fed under pressure from an oil passage A1 (A2) provided to the inner primary shaft 16 and in the meantime, the piston is turned to an original position by the resilience of a clutch spring when supplied oil pressure is reduced.

On the left side in the drawing (with parenthetical references identifying the right side) of the piston B1 (B2), a clutch plate unit configured by three friction discs fitted to the clutch case C1 (C2) so that each friction disc cannot be turned and three clutch plates fitted to an arm D1 (D2) so that each clutch plate cannot be turned is arranged, and when the piston B1

(B2) is pushed out leftward in the drawing (rightward), frictional force is generated between the clutch plates. Unless the piston B1 (B2) is pushed out by oil pressure, the torque of the primary gear 14 only turns the clutch case C1 (C2) because of the above-mentioned configuration, however, when oil pressure is supplied and the piston B1 (B2) is pushed out, the arm D1 (D2) is turned. At this time, partial clutch engagement can be also produced by hydraulic control over the linear solenoid valve 28.

An oil passage distributor 39 formed by a double tube is inserted and fixed into/to an oil gallery 16a provided on an axis of the inner primary shaft 16. Hereby, oil pressure applied to a supply oil passage 37 drives the piston B1 of the first clutch CL1 from an outer tube of the oil passage distributor 39 via the oil passage A1 and in the meantime, oil pressure applied to a supply oil passage 38 drives the piston B2 of the second clutch CL2 from between the outer tube and an inner tube of the oil passage distributor 39 via the oil passage A2.

The arm D1 on the side of the first clutch CL1 is fixed to a left end in drawing, of the inner primary shaft 16 and the arm D2 on the side of the second clutch CL2 is fixed to the outer primary shaft 15. A first speed driving gear I1 and a third speed driving gear I3 are attached to the inner primary shaft 16 turnably in a circumferential direction and so that they cannot be axially slid, and the third sleeve M3 on which a fifth speed driving gear I5 is formed is attached between both gears slidably in the axial direction and so that the third sleeve cannot be turned in the circumferential direction.

A second speed driving gear I2 and a fourth speed driving gear I4 are formed on the outer primary shaft 15. The first sleeve M1 which is slidable in the axial direction and which cannot be turned in the circumferential direction, a first speed driven gear O1 which cannot be slid in the axial direction and which cannot be turned in the circumferential direction, a second speed driven gear O2 which cannot be slid in the axial direction and which is turnable in the circumferential direction, the second sleeve M2 on which a third speed driven gear O3 is formed, which is slidable in the axial direction and which cannot be turned in the circumferential direction, a fourth speed driven gear O4 which cannot be slid in the axial direction and which is turnable in the circumferential direction and a fifth speed driven gear O5 which cannot be slid in the axial direction and which is turnable in the circumferential direction are respectively attached to the countershaft 17.

The first sleeve M1 to the third sleeve M3 are configured so that they connect/disconnect each dog clutch provided between each sleeve and its adjacent gear by being respectively axially slid. The dog clutch is formed by engaging a dog tooth or a dog slit provided to the sleeve and a dog slit or a dog tooth provided to the gear adjacent to the sleeve. The dog clutch is a well-known mechanism that enables the transmission of motive power between gears coaxially adjacent by engaging the dog tooth (the dowel) and the dog slit (the slit). In the transmission TM in this embodiment, dog clutches DC1 to DC5 for first speed to fifth speed and a dog clutch DCR for a reverse gear are provided. The transmission TM can select via which gear pair the torque of the crankshaft 2 is transmitted to the countershaft 17 by combining a state of each connection of the first clutch CL1 and the second clutch CL2 and positions of the first sleeve M1 to the third sleeve M3.

The reverse gear OR is turnably journaled to the countershaft 17, and forms a gear pair GR by being ordinarily engaged with an output gear for reverse travel (not shown). The first clutch CL1 connects/disconnects the torque for a shift to the first, the third or the fifth speed and in the meantime, the second clutch CL2 connects/disconnects the torque for a shift to the second or the fourth speed and the reverse gear. Hereby, for example, when speed is sequentially shifted up from the first speed, a state of each connection of the first clutch CL1 and the second clutch CL2 is alternately switched.

Figure 4:
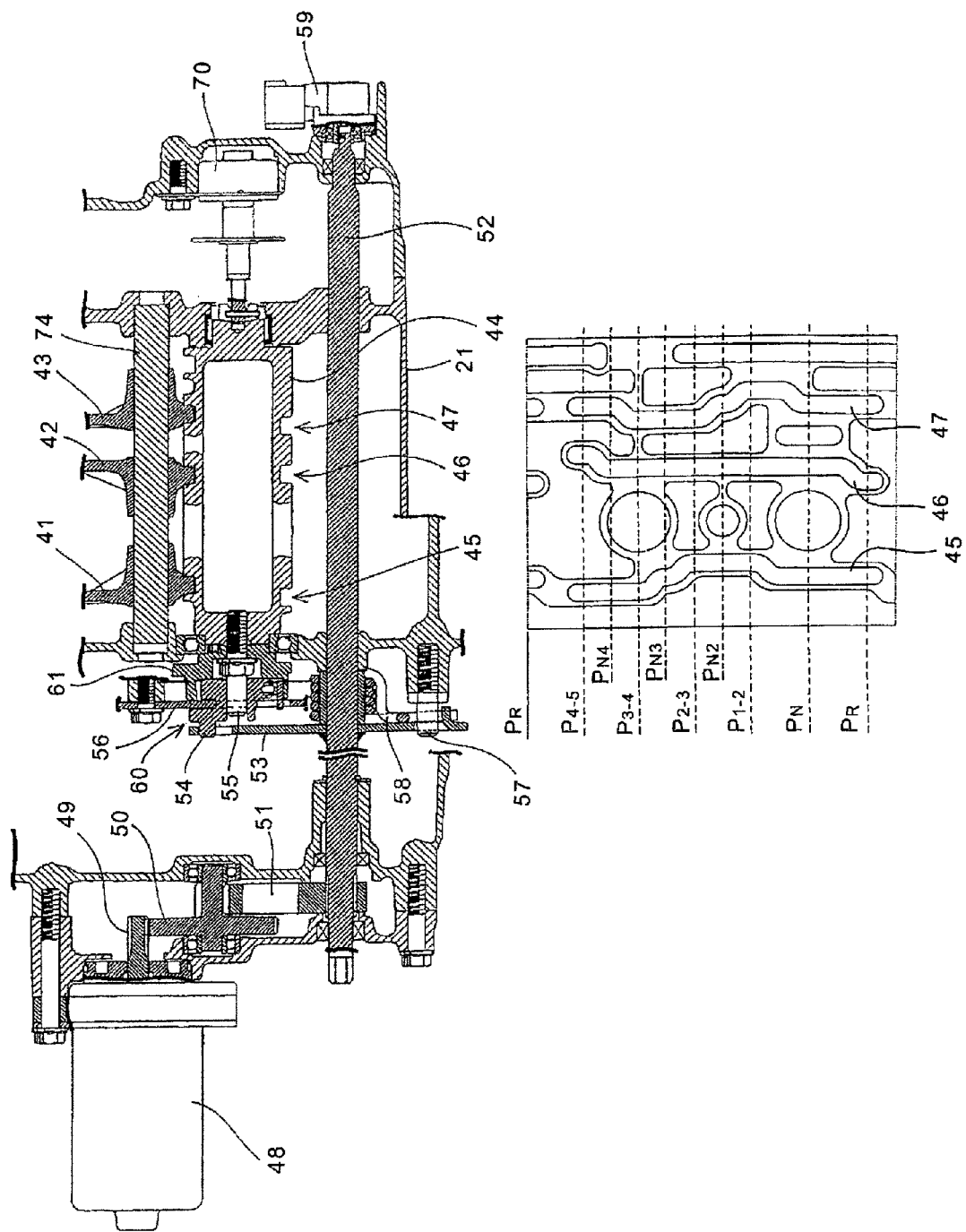
FIG. 4 shows a sectional view showing a shift mechanism and a development view showing a shift drum.

FIG. 4 shows a sectional view showing a shift mechanism of the transmission TM and a development view showing a shift drum 44. In the vicinity of the transmission TM, the hollow cylindrical shift drum 44 is rotatably journaled to the crankcase 21. The shift drum 44 is arranged in parallel with the axial direction of the transmission TM and lead grooves 45 to 47 into each of which a cylindrical projection formed at each lower end in drawing, of shift forks 41 to 43 is fitted are formed on a peripheral surface of the shift drum. The shift forks 41 to 43 are slidably fitted in an axial direction of a fork rod 74 arranged in parallel with the shift drum 44. Hereby, when the shift drum 44 is turned, the first sleeve M1 to the third sleeve M3 (see FIG. 3) fitted to each other end (not shown) of the shift forks 41 to 43 are slid in the axial direction.

Normally, turned positions corresponding to the number of speeds by 1 to 1 are set on the shift drum of the transmission, however, on the shift drum 44 in this embodiment, original turned positions are set according to the above-mentioned combination with the twin clutch TCL. Referring to the development view shown in FIG. 4, for the turned positions on the shift drum 44, P1-2 corresponding to the first to the second speed, P2-3 corresponding to the second to the third speed, P3-4 corresponding to the third to the fourth speed and P4-5 corresponding to the fourth to the fifth speed are set as a predetermined turned position, following PR corresponding to reverse travel and PN corresponding to a neutral position. This means that when the shift drum 44 is located in the predetermined turned position of P1-2 for example, a shift between the first and the second speeds is enabled by only switching a state of each connection of the first clutch CL1 and the second clutch CL2.

In this embodiment, PN2, PN3 and PN4 as a half-neutral position are set in the middle of each predetermined turned position of the shift drum 44. When the shift drum 44 is turned from P1-2 which is the predetermined turned position to the next predetermined turned position P2-3 in increasing order for example, the turning speed of the shift drum 44 is temporarily reduced because the half-neutral position PN2 is passed by setting these half-neutral positions. Hereby, a shift shock is reduced and a more secure shift can be executed.

The shift drum 44 is turned by an electric motor 48 as an actuator the drive of which is controlled by a controller described later. The torque of the electric motor 48 is transmitted to a shift spindle 52 from an output shaft 49 via an intermediate gear 50 and a secuta gear 51. A plate type shift arm 53 is attached to the shift spindle 52 and when the shift arm 53 is once reciprocated by a predetermined angle in normal/reverse rotation, the shift drum 44 is turned in one direction by the predetermined angle via a pole ratchet mechanism 60.

A drum center 61 fixed to the shift drum 44 so that the drum center cannot be turned by a center bolt 55 is provided with a function of moderating operation for switching the predetermined turned position and the half-neutral position of the shift drum 44. The pole ratchet mechanism 60 is turnably held by a guide plate 56 fixed to the crankcase 21 and a shifter assembly 54 and one end of the shifter assembly 54 is fitted into a fitting hole formed in the shift arm 53. A return spring 58 that applies pressure in a direction in which the shift arm 53 is returned to an initial position is fitted between the shift spindle 52 and the guide pin 57. A shift position sensor 70 as position detecting means that detects the current speed based upon a turned position of the shift drum 44 is provided at a right end in drawing, of the shift drum 44 and a turning angle sensor 59 is attached to a right end of the shift spindle 52.

In the transmission TM in this embodiment, a so-called "preparatory shift" that the shift drum 44 is turned to the predetermined turned position according to the next speed beforehand in preparation for the next shift with the transmission of the torque maintained during running at predetermined shifted speed is enabled. This preparatory shift means operation for turning the shift drum 44 to the next predetermined turned position on the side of an up-shift beforehand in preparation for an up-shift to the next fourth speed after an up-shift from the second speed to the third speed is completed for example, and in the above-mentioned example, is equivalent to the turning of the shift drum 44 from P2-3 to P3-4 (see FIG. 4) during running at the third speed. As an up-shift is completed by only turning off the shift solenoid 25 at the same time as a shift instruction when the up-shift instruction to the fourth speed is output if only such a preparatory shift is executed, shifting time can be reduced. At the time of a down-shift, after a shift instruction of the down-shift is input, the turning of the shift drum 44 is started.

Figure 5:
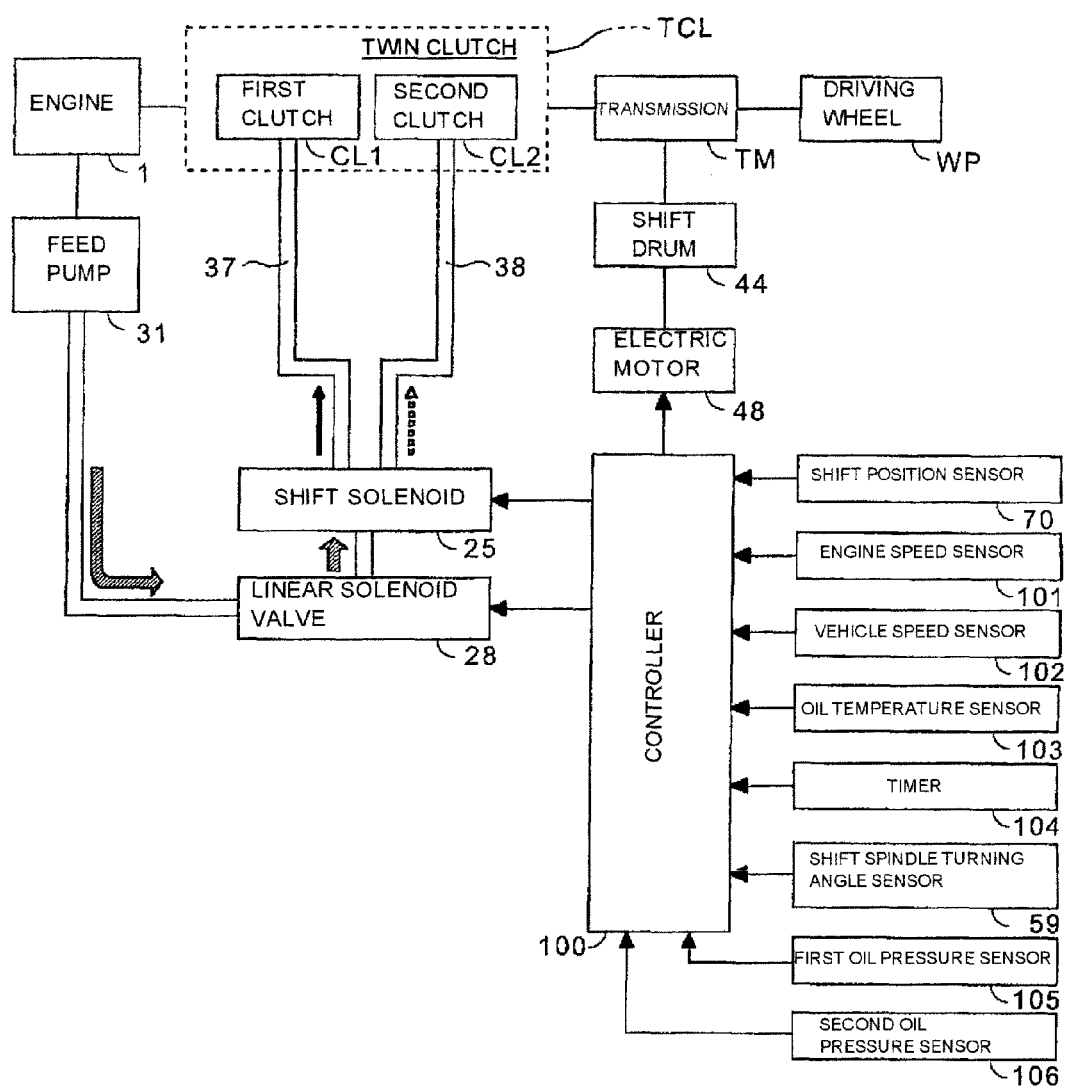
FIG. 5 is a block diagram showing the configuration of the shift controller equivalent to this embodiment.

FIG. 5 is a block diagram showing the configuration of the shift controller equivalent to this embodiment. The same reference numeral as the above-mentioned one denotes the same or the similar part. The transmission TM functions as an automatic or a semi automatic transmission to which an occupant gives an instruction for a shift by operating a switch by instructing the controller 100 to control the drive of the shift solenoid 25, the linear solenoid valve 28 and the electric motor 48. Hereby, the torque of the engine 1 is transmitted to a driving wheel WP after deceleration at predetermined shift stages of the transmission TM.

The controller 100 can control the timing and the velocity of the connection/the disconnection of the twin clutch TCL, the driving timing and the driving velocity of the shift drum 44 according to various running conditions. A signal output from various sensors including a shift position sensor 70 that detects a turned position of the shift drum 44, an engine speed sensor 101 that detects the revolution speed of the engine 1, a vehicle speed sensor 102 that detects the running speed of a vehicle, an oil temperature sensor 103 that detects the temperature of lubricating oil of the engine, a timer 104 that measures various predetermined time calculated in the controller 100, the shift spindle turning angle sensor 59 that detects a turning angle of the shift spindle 52, and a first oil pressure sensor 105 and a second oil pressure sensor 106 that respectively detect oil pressure generated in the first clutch CL1 and in the second clutch CL2 is input to the controller 100.

The temperature of lubricating oil of the engine is apt to vary according to a situation in which the engine is operated, when the viscosity of the lubricating oil decreases because the temperature rises, frictional resistance and others generated between the shift drum and the shift fork and between the shift fork and the shift sleeve decrease, and even if the output of the motor (motor duty) is the same, the shift drum is apt to be quickly turned.

Figure 6:
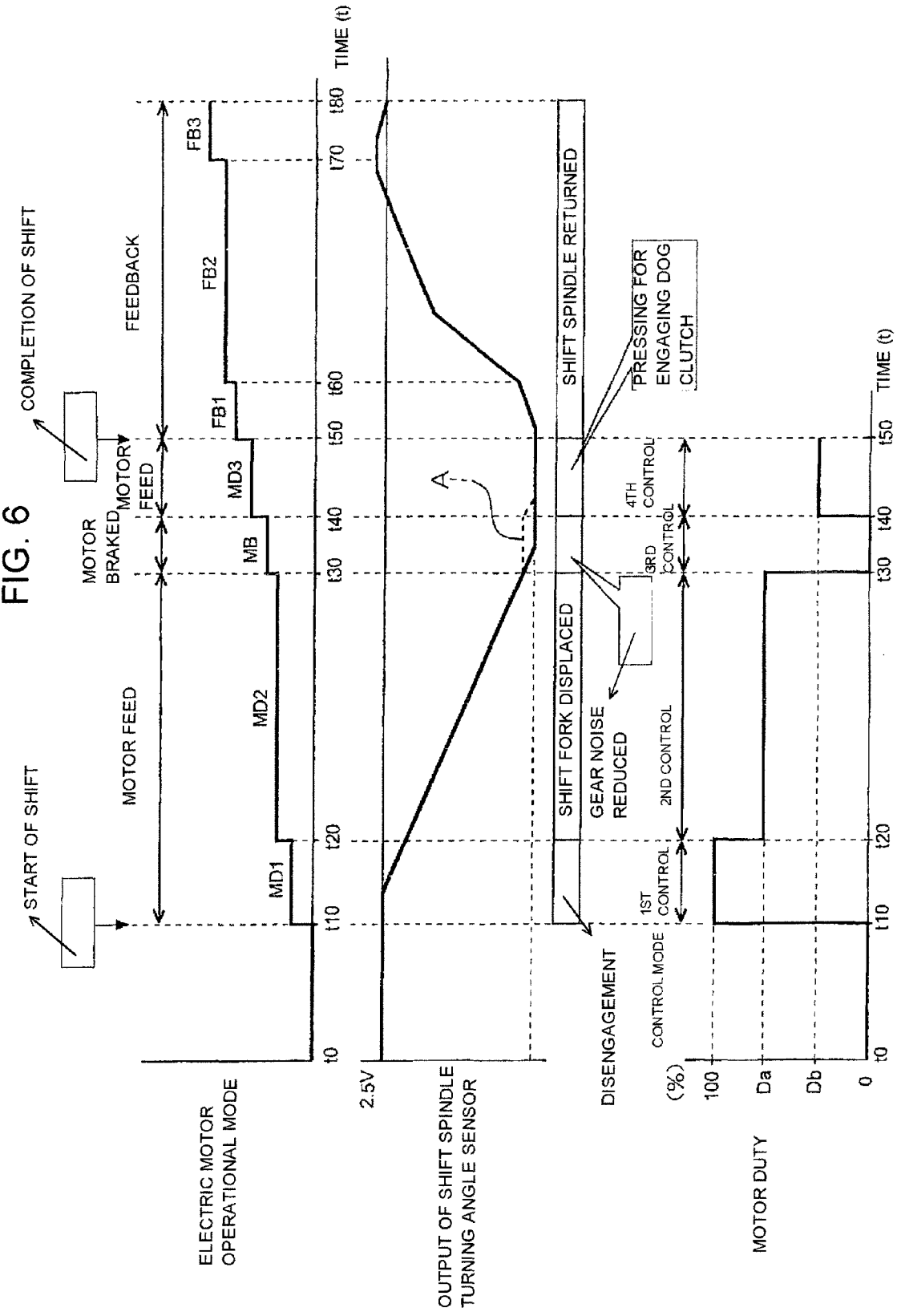
FIG. 6 is a timing chart showing a procedure for electric motor control by the shift controller equivalent to this embodiment.
Figure 7:
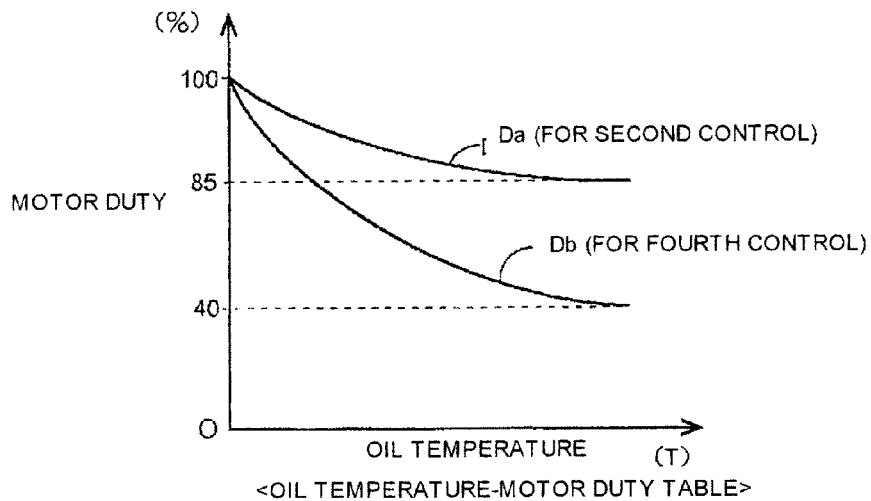
FIG. 7 shows a data table for providing relation between oil temperature and motor duty.
Figure 8:
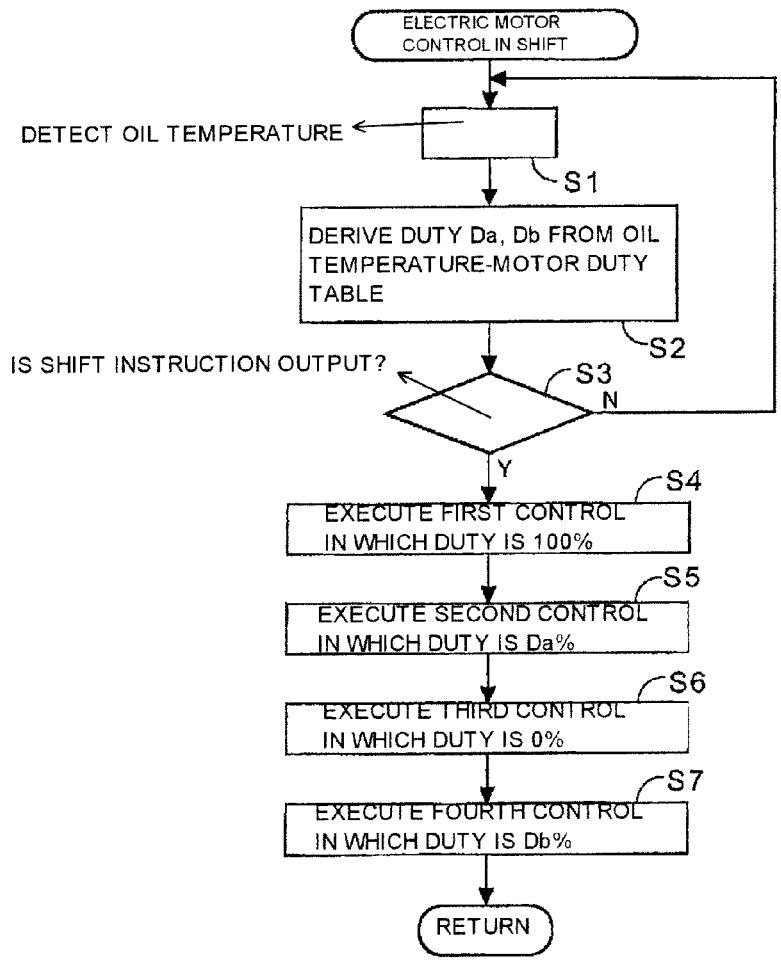
FIG. 8 is a flowchart showing a flow of electric motor control in a shift in this embodiment.

While the shift drum is turned from the current predetermined turned position to the next predetermined turned position, operation for releasing the engagement of the currently engaged dog clutch and engaging the next dog clutch is executed. At this time, when the turning speed of the shift drum is too fast, noise when the next dog clutch is engaged may get bigger. To cope with this problem, the shift controller equivalent to this embodiment is provided with a characteristic that the turning speed of the shift drum 44 in a shift, that is, the revolution speed of the electric motor 48 is varied according to the temperature of engine lubricating oil. Referring to FIGS. 6 to 8, the details of electric motor control in a shift will be described below.

FIG. 6 is a timing chart showing a procedure for electric motor control by the shift controller according to this embodiment. In FIG. 6, in order from the upside, an operational mode of the electric motor 48 when the shift drum 44 is turned from the current predetermined turned position to the next predetermined turned position, an output signal of the shift spindle turning angle sensor 59 and motor duty applied to the electric motor 48 are shown. The shift spindle turning angle sensor 59 outputs, for example, 2.5 V when a turning angle is zero, that is, when the sensor is located at an initial position and as a turning angle increases, an output value gets smaller. The electric motor control in a shift in this embodiment is executed in the preparatory shift in the up-shift as described above and in addition, can be applied to a preparatory shift in a down-shift and a shift of a single clutch type transmission.

The electric motor control in a shift in this embodiment includes first to fourth control executed between time t10 to t50. Each execution time (first to third predetermined time) of the first to the fourth control is predetermined and a transition process to the next control is sequentially executed based upon time measured by the timer 104 (see FIG. 4).

First, at the time t10, the first control (an operational mode: MD1) in which the duty ratio of the electric motor 48 is 100% is started according to a preparatory shift instruction by the controller. The first control is continued until the time t20. An execution period (first predetermined time) of the first control includes a period in which operation (disengagement) for drawing the dog tooth out of the dog slit and releasing the engagement of the dog clutch as the shift drum 44 is turned is executed. The operation for drawing the dog tooth is executed in a state in which duty applied to the electric motor 48 is maximum and the operation for drawing the dog tooth can be promptly executed.

From the time t20, the second control (an operational mode: MD2) depending upon the duty ratio of Da % derived based upon the temperature of lubricating oil, is started. The duty ratio of Da applied in the second control and the duty ratio of Db applied in the fourth control described later are set so that each minimum value in each set range is smaller than 100% (85% in the second control, 40% in the fourth control) and the higher the oil temperature is, the smaller the minimum value is. Each duty ratio of Da and Db is acquired by applying the temperature T of lubricating oil detected by the oil temperature sensor 103 to an oil temperature-motor duty table shown in FIG. 7.

The second control depending upon the duty ratio of Da % is continued until the time t30. In the second predetermined time, the electric motor 48 is driven at the duty ratio of Da % (100 to 85%) the minimum value in the set range of which is smaller than that in the first control and the drive of the shift fork according to this is continued. Hereby, when the oil temperature is high and the turning speed of the shift drum 44 is too fast, the shift drum 44 can be decelerated.

Next, between time t30 and t40, the third control (an operational mode: MB) in which duty ratio is 0% (the output of the motor is zero) is executed. This means that the drive of the electric motor 48 depending upon motor duty calculated according to the oil temperature is not performed. In the third predetermined time, operation (engagement) for engaging the dog clutch corresponding to the next speed is completed. To reduce noise and shock made when the dog clutch is engaged, it is desirable to reduce the turning speed of the shift drum 44 in the operation for engaging the dog clutch. According to the third control, the operation for engaging the dog clutch can be completed using only rotational inertia force generated on the shift drum 44. In an execution period of the third control, the electric motor 48 is controlled so that regenerative power generation is performed by the rotational inertia force, thus more braking may occur.

In a fourth predetermined time between the time t40 and t50, the fourth control (an operational mode: MD3) depending upon the duty ratio of Db % (100 to 40%) is executed. As shown in FIG. 7, a minimum value (40%) in a range in which the duty ratio of Db % is set is set to a smaller value than the minimum value (85%) in the set range of the duty ratio of Da %. According to the fourth control, the sleeve for a shift provided with the dog tooth is pressed upon the transmission gear provided with the dog slit by applying small output to the electric motor 48.

In FIG. 7, the output of the shift spindle turning angle sensor reaches a lower limit during the third control. Therefore, when a lost motion mechanism between the shift spindle 52 and the shift drum 44 is not operated, it can be estimated that at this time, the shift drum 44 has reached the next predetermined turned position. In this case, even if the sleeve is pressed upon the transmission gear in the fourth control, the shift drum 44 is not turned. However, for example, when the dog clutch is not engaged until the third control is completed and the shift drum 44 does not reach the predetermined turned position, the dog clutch is securely engaged by the execution of the fourth control as shown by a broken line A.

An execution period for releasing the engagement of the dog clutch and engaging the dog clutch corresponding to a turning angle of the shift drum is different depending upon individual design of the transmission and the shift drum. However, according to the shift controller according to the present invention, electric motor control suitable for various transmissions can be executed by optionally setting the execution time of the first to the fourth control.

In this embodiment, shift spindle return control for driving the shift spindle 52 (see FIG. 4) to an initial position is executed when the fourth control is finished. The return control is executed to adjust return speed against pressure by the return spring 58 by applying motor duty by feedback control FB1, FB2, FB3 to the electric motor 48.

FIG. 8 is a flowchart showing a flow of the electric motor control in a shift in this embodiment. In a step S1, the temperature of engine lubricating oil is detected by the oil temperature sensor 103 and in a step S2, Da and Db are derived from the oil temperature-motor duty table. In the next step S3, it is determined whether a shift instruction is output or not and when no shift instruction is output, control is returned to the step S1. The shift instruction may be also a shift instruction by the rider such as the operation of a button in addition to an instruction to execute a preparatory shift by the controller 100.

When it is determined in the step S3 that the shift instruction is output, a step S4 in which the first control where the duty of 100% is applied is executed, a step S5 in which the second control where the duty of Da % is applied is executed, a step S6, in which the third control where the duty of 0% is applied, is executed and a step S7 in which the fourth control where the duty of Db % is applied is executed are sequentially executed so as to drive the shift drum 44 from the current predetermined turned position to the next predetermined turned position, and a series of control is finished.

As described above, according to the shift controller according to the present invention, as the first control in which the electric motor is driven at the duty ratio of 100% is executed in the first predetermined time until the predetermined period elapses, since the drive of the electric motor 48 is started when the shift drum 44 is turned from the predetermined turned position to the adjacent next predetermined turned position, and the electric motor 48 is driven using duty ratio in which the higher the oil temperature is, the smaller its value is after the first predetermined time elapses, noise and others when the dog clutch is engaged can be reduced even if the temperature of lubricating oil is high and the shift drum is apt to be turned fast. Time until a shift is finished can be reduced by providing the first predetermined time in which the output of the motor is made maximum and the engagement of the dog clutch is released, compared with a case that the output of the motor is reduced during a complete operation of a shift.

The configuration of the transmission and the shift mechanism, the first to the fourth predetermined time and a mode of the oil temperature-motor duty table are not limited to the embodiment and various changes are allowed. For example, the first to the fourth control over the electric motor can be applied to various transmissions a shift drum of which is turned by an electric motor. The shift controller according to the present invention can be applied to a motorcycle and a three-wheeled vehicle in addition to a four-wheel ATV.

DESCRIPTION OF REFERENCE NUMERALS AND LETTERS

1 - - - Engine
25 - - - Shift solenoid
28 - - - Linear solenoid valve
31 - - - Feed pump
44 - - - Shift drum
48 - - - Electric motor
59 - - - Shift spindle turning angle sensor
100 - - - Controller
103 - - - Oil temperature sensor
CL1 - - - First clutch
CL2 - - - Second clutch
DC1 - - - Dog clutch for first speed
Dc2 - - - Dog clutch for second speed
TCL - - - Twin clutch
TM - - - Transmission

We claim:

1. A shift controller for a motor vehicle, said shift controller comprising:
    an electric motor configured to rotate a shift drum associated with a transmission;
    an oil temperature sensor configured to detect temperature of lubricating oil for the transmission; and
    a controller configured to control the electric motor,
    wherein the controller controls the electric motor to operate in a preset first motor duty until a first predetermined time elapses after operation of the electric motor is started when the shift drum is turned from a first predetermined position to a second predetermined position, and wherein the controller is also configured to operate the electric motor in a second motor duty calculated based upon oil temperature after the first predetermined time elapses.

2. A shift controller according to claim 1, wherein the first predetermined time includes a time until an engagement of a dog clutch associated with the transmission is released.

3. A shift controller according to claim 1, wherein a second predetermined time that begins after the first predetermined time elapses and runs until engagement of a dog clutch for a next transmission speed begins, wherein in this second predetermined time, the controller is configured to operate the electric motor in the motor duty calculated according to the oil temperature and a minimum value in a range in which the motor duty is set to a smaller value than during the first predetermined time.

4. A shift controller according to claim 3, wherein, after elapse of the second predetermined time, the electric motor is not driven based upon the motor duty calculated according to oil temperature, for a third predetermined time.

5. A shift controller according to claim 4, wherein after elapse of the third predetermined time, the turning of the shift drum is completed and the electric motor is driven in the motor duty calculated according to oil temperature, for a fourth predetermined time, and wherein a minimum value in a range in which the motor duty is set in the fourth predetermined time is set to a smaller value than the minimum value in the range in which the motor duty applied in the second predetermined time is set.

6. A shift controller according to claim 5, wherein the controller is configured to receive data from a data table, said data table deriving each motor duty applied in the second predetermined time and in the fourth predetermined time based upon the oil temperature.

7. A shift controller according to claim 1, wherein the transmission comprises a twin clutch type transmission provided with a body having a plurality of gear pairs according to speed between a main shaft and a countershaft and a twin clutch configured by a first clutch and a second clutch disposed on a main shaft, wherein torque of an engine is selectively applied to the transmission by the twin clutch, wherein the controller is configured to execute a preparatory shift when the shift drum is turned to a predetermined turned position according to the next speed while the torque is transmitted at a predetermined speed, and wherein a control of motor duty by the controller is executed in the preparatory shift.

8. A method of controlling shifting in a motor vehicle, said method comprising:

Providing an electric motor;

Rotating, with the electric motor, a shift drum associated with a transmission;

detecting a temperature of lubricating oil for the transmission, with an oil temperature sensor;

controlling the electric motor with a controller, such that the electric motor operates in a preset first motor duty until a first predetermined time elapses after operation of the electric motor is started when the shift drum is turned from a first predetermined position to a second predetermined position, and wherein the electric motor is operated in a second motor duty calculated based upon oil temperature after the first predetermined time elapses.

9. A method according to claim 8, further comprising operating the electric motor in the motor duty calculated according to the oil temperature during a second predetermined time that begins after the first predetermined time elapses and runs until engagement of a dog clutch for a next transmission speed begins, wherein the motor duty is also calculated according to a minimum value in a range in which the motor duty is set to a smaller value than during the first predetermined time.

10. A method according to claim 8, further comprising selectively applying engine torque to the transmission by a twin clutch, and executing a preparatory shift when the shift drum is turned to a predetermined turned position according to the next speed while the torque is transmitted at a predetermined speed.

11. A shift controller for a motor vehicle, said shift controller comprising:

motor means for rotating a shift drum associated with a transmission;

oil temperature sensor means for dectecting temperature of lubricating oil for the transmission; and controller means for controlling the motor means, wherein the controller means is for controlling the motor means to operate in a preset first motor duty until a first predetermined time elapses after operation of the motor means is started when the shift drum is turned from a first predetermined position to a second predetermined position, wherein the controller means is also for operating the motor means in a second motor duty calculated based upon oil temperature after the first predetermined time elapses.

12. A shift controller according to claim 11, wherein a second predetermined time that begins after the first predetermined time elapses and runs until engagement of a dog clutch for a next transmission speed begins, wherein in this second predetermined time, the controller means is for operating the motor means in the motor duty calculated according to the oil temperature and a minimum value in a range in which the motor duty is set to a smaller value than during the first predetermined time.

13. A shift controller according to claim 12, wherein, after elapse of the second predetermined time, the motor means is not driven based upon the motor duty calculated according to the oil temperature, for a third predetermined time.

14. A shift controller according to claim 12, wherein after elapse of the third predetermined time, the turning of the shift drum is completed and the motor means is driven in the motor duty calculated according to oil temperature for a fourth predetermined time, and wherein a minimum value in a range in which the motor duty is set in the fourth predetermined time is set to a smaller value than the minimum value in the range in which the motor duty applied in the second predetermined time is set.

15. A shift controller according to claim 12, wherein the controller means is also for receiving data from a data table, said data table deriving each motor duty applied in the second predetermined time and the fourth predetermined time based upon the oil temperature.

16. A shift controller according to claim 11, wherein the transmission comprises a twin clutch type transmission provided with a body having a plurality of gear pairs according to speed between a main shaft and a countershaft, and twin clutch means comprising first clutch means and second clutch means disposed on a main shaft, said twin clutch means for selectively applying torque from an engine to the transmission, wherein the controller means is also for executing a preparatory shift when the shift drum is turned to a predetermined turned position according to the next speed while the torque is transmitted at a predetermined speed, and wherein control of motor duty by the control means is executed in the preparatory shift.

* * * * *